April 25, 1933.   A. J. A. PETERSON   1,905,240
PROTECTIVE SYSTEM FOR GENERATOR FIELD CIRCUITS Filed Oct. 6, 1928

INVENTOR
Alfred J. A. Peterson.
BY
Wesley G. Carr
ATTORNEY

Patented Apr. 25, 1933

1,905,240

UNITED STATES PATENT OFFICE

ALFRED J. A. PETERSON, OF WILKINSBURG, PENNSYLVANIA, ASSIGNOR TO WESTINGHOUSE ELECTRIC & MANUFACTURING COMPANY, A CORPORATION OF PENNSYLVANIA

PROTECTIVE SYSTEM FOR GENERATOR FIELD CIRCUITS

Application filed October 6, 1928. Serial No. 310,691.

This invention pertains to systems for protecting the field winding of a generator from infurious consequences resulting from a sudden interruption of the field current.

It is well known that, because of the considerable inductance of the field windings employed in connection with large turbo-alternators, the sudden interruption of the current through the field winding results in the induction of a high voltage therein. It has been observed that this high voltage has had a damaging effect upon apparatus connected to the field winding circuit and it is, therefore, the object of this invention to provide means for preventing an abnormal rise of voltage across a generator field winding upon the interruption of the current therethrough.

It has also been observed that, where a generator is connected to a bus energized from another source, when the field winding is deenergized, the transformer action between the armature which remains connected to the bus and the open-circuited field winding, causes the generation of an alternating voltage in the latter, which may be of such value as to damage apparatus connected thereto.

It is an object of my invention, therefore, to provide means for tripping a generator off of the bus as soon as the current supplied to the field winding has been interrupted.

Another object of my invention is to make possible the use of a lightning arrester of low capacity, connected across the generator field winding to prevent the voltage thereacross from rising to an abnormal value, by providing means for disconnecting the generator from the bus when the field current has been interrupted, to prevent any transformer action between the armature and field windings.

Other objects of my invention will appear in the course of the following description thereof, and the novel features will be pointed out in the appended claims.

My invention may be best understood by referring to the accompanying drawing, Figs. 1 and 2 of which are diagrams illustrating alternative solutions of the problem hereinabove stated.

Figure 1:
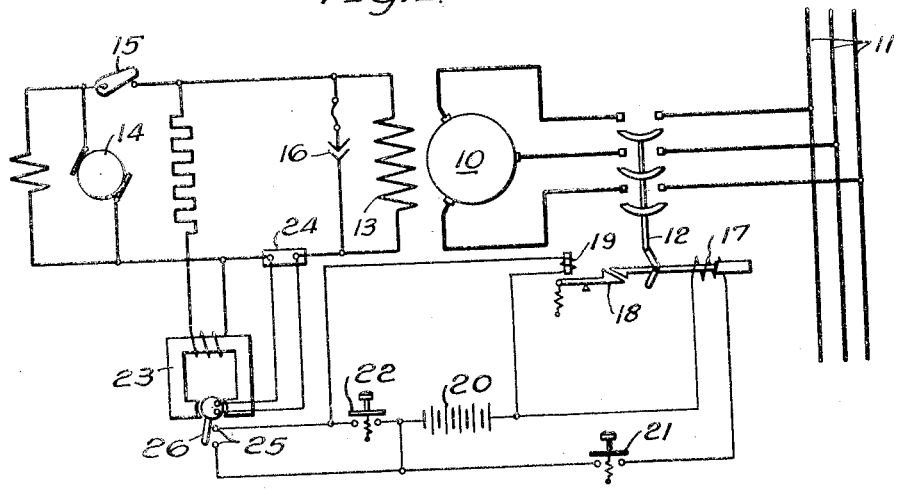

Referring in detail to Fig 1, an alternating-current generator 10 is adapted to be connected to a bus 11, through a circuit interrupter 12. The generator field winding is shown at 13 and the circuit thereof includes an exciter 14 or other source of direct current and a control switch 15. Connected across the field winding 13 is a lightning arrester 16, which may be of any known construction.

The circuit breaker 12 is also of a well-known type and is arranged to be closed by the energization of its closing coil 17 and latched by the locking mechanism 18, which may be released by energization of the trip coil 19. A battery 20 or other suitable source of current is provided to energize the closing and tripping coils of the circuit breaker, and switches 21 and 22 are provided to control the energization of these coils.

In addition to the switch 22 for controlling the trip coil 19, a relay 23 is provided. This relay is of the galvanometer type having a magnetic circuit which may be either that of a permanent magnet or an electromagnet. In the embodiment illustrated, the magnetic circuit of the relay 23 is excited by a coil connected across the exciter 14 in series with a protective resistor.

The moving coil of the galvanometer relay 23 is connected across a shunt 24 in the generator field circuit and this moving coil is provided with contact means such as the fixed contacts 25 and the moving contact arm 26. The arm 26 is arranged to be normally in engagement with the contacts 25 but when the exciter 14 supplies current to the field winding 13, the moving coil of the relay 23 is actuated to move the contact arm 26 out of engagement with the contacts 25. It will be apparent that as long as the field winding circuit is complete and normal current circulates therein, the generator will not be disconnected from the bus 11 by the operation of the relay 23. As soon, however, as the field circuit is broken by the accidental opening of the switch 15 which may, for example, be an automatic switch, the contact arm 26 of the relay 23 will engage the contacts 25 to energize the tripping coil 19 of the circuit breaker 12, whereby the circuit breaker is opened and the generator 10 disconnected from the bus 11.

By means of the system described above, the appearance of an abnormally high voltage at the terminals of the generator field winding is prevented. The lightning arrester 16 serves to permit a limited current to pass through the field winding in response to the self-induced electromotive force, and the induced voltage is thereby prevented from rising to a dangerously high value.

A novel feature of my invention resides in the combination between the lightning arrester 16 and the relay 23 for protecting associated apparatus from both the self-induced voltage and from the voltage induced by transformer action between the armature and field windings when the normal current in the latter is interrupted. When the use of a lightning arrester across the terminals of a field winding was first suggested, it was found that the transformer action between the armature and field windings of the generator required a lightning arrester of extremely large capacity to take care of the dynamic discharge resulting from the voltage induced in the field winding by the current flowing in the armature winding which remained connected to the bus. By the means I have described, it is possible to make use of a lightning arrester of low capacity, inasmuch as it is called upon to protect against only the voltage induced in the field winding by self induction, the voltage induced by transformer action between the armature and field windings being eliminated when the relay 23 operates to cause the generator to be disconnected from the bus.

Figure 2:
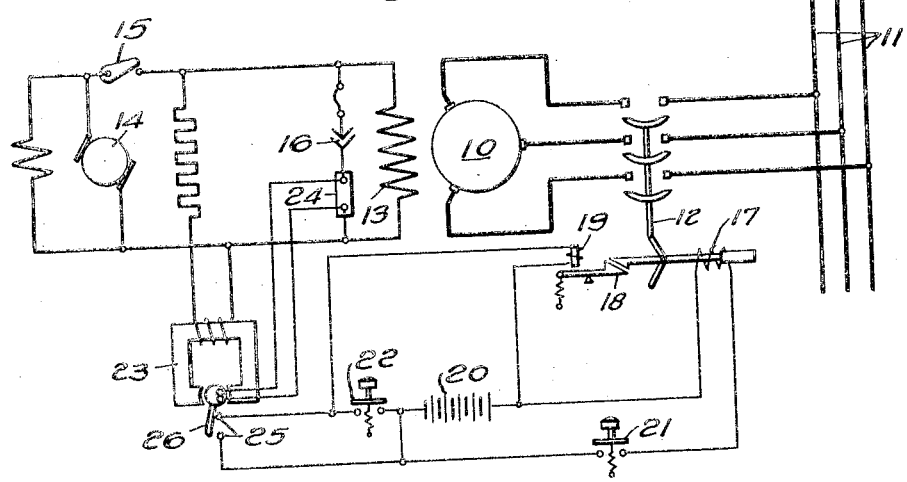

In Fig. 2 I have described an alternative system of connections which differs from that shown in Fig. 1 only in the fact that the shunt 24 is connected in series with the lightning arrester 16 and in that the contact 26 of the relay 23, instead of normally engaging the contacts 25, is normally disengaged. When current passes through the lightning arrester and the shunt as a result of the high voltage induced in the field winding 13, when the field circuit is opened, the contact 26 of the relay 23 engages the contacts 25 to cause the disconnection of the generator 10 from the bus 11. This system has the advantage that, should the circuit interrupter 12 be closed while the generator 10 is stationary, and the field winding de-energized, the voltage induced in the field winding by the transformer action between the armature and the field windings would be sufficient to break down the lightning arrester 16, pass current through the shunt 24 and energize the moving coil of the relay 23 to effect immediate tripping of the circuit breaker 12.

It will thus be apparent that the system of my invention possesses numerous valuable advantages over anything previously known to the art.

Although I have described herein only two modifications of my invention, it is to be understood that changes and alterations may be made therein and that such changes are to be considered within the scope of the appended claims.

I claim as my invention:—

1. The combination with a generator, a load adapted to be supplied by said generator and a switch provided with tripping means for connecting said load to said generator, of a galvanometer relay having a moving coil adapted to be connected to a shunt in circuit with the generator field and contacts controlled by said moving coil for controlling the tripping means, said contacts being maintained disengaged as long as normal current flows in the field circuit and operatively engaged when the field current is interrupted to effect the substantially instantaneous operation of the tripping means to open the switch, and a lightning arrester connected in shunt-circuit relation with the field winding to absorb the self-induced voltage in said winding when the current therethrough is interrupted.

2. A protective system for generator field winding circuits comprising a circuit interrupter in the circuit supplied by the generator armature windings, a polarized relay responsive to the current flowing in the field winding circuit, said relay having contacts for directly controlling the trip coil of said interrupter, and means in shunt circuit relation with the generator field winding for absorbing the voltage induced in the field winding when the current therethrough is interrupted.

3. The combination with an alternating-current generator having a field winding, a switch for connecting the generator armature winding to a circuit, of means for opening said switch substantially instantaneously in response to an interruption of the field current, and means for preventing the voltage across the field winding from rising to abnormal values when the current flowing in the field winding is interrupted.

4. In combination with a generator having a field winding and being adapted to be connected through a circuit interrupter to a bus energized from other sources, a circuit including a lightning arrester connected across the field winding, and a relay responsive to a flow of current in said circuit for tripping the interrupter substantially instantaneously to prevent an abnormal rise in the voltage across said field winding when the current therethrough is interrupted.

5. In combination, a generator provided with a field winding, a source of excitation for the generator, a switch for connecting the generator to a power circuit, said switch being provided with tripping means, a discharge device connected across the field winding, a shunt connected in series-circuit relation with said discharge device, and a relay operable in response to a flow of current through said discharge device and shunt for effecting the substantially instantaneous operation of the tripping means thereby to provide for automatically disconnecting the generator from the power circuit in response to an interruption of the excitation of the field winding.

6. The combination with a generator having a field winding, a switch provided with tripping means for connecting the generator to a load circuit, a source of excitation for the generator field winding, a discharge device connected across the generator field winding, and means operable in response to the flow of current through the discharge device in the event of failure of the excitation source for effecting substantially instantaneous operation of the tripping means, thereby to provide for immediately disconnecting the generator from the load circuit in the event of field failure.

7. The combination with a generator provided with a field winding, a switch for connecting the generator to a power circuit, a source of excitation for the generator field winding, a low-capacity discharge device connected across the generator field winding, and means responsive to the flow of self-induced current through the discharge device in the event the field excitation current is interrupted for instantly opening the switch to disconnect the generator from the power circuit, thereby to prevent subjecting the field winding to voltage resulting from transformer action between the field and armature windings of the generator upon the interruption of the excitation current.

In testimony whereof, I have hereunto subscribed my name this 22nd day of September 1928.

ALFRED J. A. PETERSON.